United States Patent
Bhattad et al.

(10) Patent No.: US 9,887,754 B2
(45) Date of Patent: Feb. 6, 2018

(54) METHOD AND APPARATUS FOR OPTIMIZING POWER DISTRIBUTION BETWEEN SYMBOLS

(75) Inventors: Kapil Bhattad, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 13/100,069

(22) Filed: May 3, 2011

(65) Prior Publication Data

US 2012/0106595 A1 May 3, 2012

Related U.S. Application Data

(60) Provisional application No. 61/331,360, filed on May 4, 2010, provisional application No. 61/332,673, filed on May 7, 2010.

(51) Int. Cl.
*H04B 7/06* (2006.01)
*H04B 7/04* (2017.01)
(Continued)

(52) U.S. Cl.
CPC ......... *H04B 7/0617* (2013.01); *H04B 7/0421* (2013.01); *H04B 7/0684* (2013.01);
(Continued)

(58) Field of Classification Search
CPC ... H04L 5/0007; H04L 5/0053; H04L 5/0048; H04L 5/0057; H04L 25/0226;
(Continued)

(56) References Cited

U.S. PATENT DOCUMENTS

2004/0179627 A1 9/2004 Ketchum et al.
2008/0186212 A1* 8/2008 Clerckx ............... H04B 7/0456
341/55

(Continued)

FOREIGN PATENT DOCUMENTS

CN 101069258 A 11/2007
CN 101300749 A 11/2008
(Continued)

OTHER PUBLICATIONS

Ericsson et al., "Layer-To-Antenna Port Mapping for LTE-Advanced", 3GPP TSG-RAN WG1 Meeting #60, Feb. 26, 2010, R1-100848.
(Continued)

*Primary Examiner* — Daniel Washburn
*Assistant Examiner* — Eboni Hughes
(74) *Attorney, Agent, or Firm* — Arent Fox LLP

(57) ABSTRACT

A method, an apparatus, and a computer program product for wireless communication are provided in which a first pre-coding matrix for use on a portion of a set of resource blocks (RBs) is determined. At least one beamforming vector of the set of beamforming vectors is modified by applying a phase rotation to generate a modified pre-coding matrix. The modified pre-coding matrix is applied to one or more demodulation reference signals and data associated with the portion of the set of RBs for transmission using at least one antenna.

29 Claims, 17 Drawing Sheets

(51) Int. Cl.
  *H04L 25/03*    (2006.01)
  *H04L 5/00*     (2006.01)
  *H04L 25/02*    (2006.01)
  *H04W 52/42*    (2009.01)

(52) U.S. Cl.
  CPC .......... *H04L 5/0048* (2013.01); *H04L 5/0057* (2013.01); *H04L 25/0226* (2013.01); *H04L 25/03343* (2013.01); *H04L 25/03866* (2013.01); *H04B 7/0632* (2013.01); *H04B 7/0639* (2013.01); *H04B 7/0669* (2013.01); *H04L 5/0026* (2013.01); *H04L 25/0204* (2013.01); *H04L 2025/03414* (2013.01); *H04L 2025/03426* (2013.01); *H04L 2025/03802* (2013.01); *H04W 52/42* (2013.01)

(58) Field of Classification Search
  CPC ......... H04L 25/03343; H04L 25/03886; H04L 5/0026; H04L 25/0204; H04L 2025/03414; H04L 2025/03426; H04L 2025/03802; H04B 7/0617; H04B 7/0421; H04B 7/0684; H04B 7/0632; H04B 7/0639; H04B 7/0669; H04W 52/42
  USPC .......................... 375/260, 267; 370/203, 208
  See application file for complete search history.

(56) References Cited

U.S. PATENT DOCUMENTS

| | | | |
|---|---|---|---|
| 2009/0046646 A1 | 2/2009 | Cho et al. | |
| 2011/0085587 A1* | 4/2011 | Moulsley | H04B 7/0408 375/219 |
| 2013/0077660 A1* | 3/2013 | Ko | H04B 7/0639 375/219 |

FOREIGN PATENT DOCUMENTS

| | | | | |
|---|---|---|---|---|
| CN | 101510799 A | | 8/2009 | |
| CN | 101682607 A | | 3/2010 | |
| EP | 1916778 | * | 4/2008 | ............... H04B 7/04 |
| EP | 1916778 A2 | | 4/2008 | |
| EP | 2091198 | * | 8/2009 | ............ H04L 27/26 |
| EP | 2091198 A2 | | 8/2009 | |
| EP | 2165434 A1 | | 3/2010 | |
| EP | 2211515 A1 | | 7/2010 | |
| JP | 2009194732 A | | 8/2009 | |
| WO | WO-2008097035 A1 | | 8/2008 | |
| WO | WO2009022833 A2 | | 2/2009 | |
| WO | WO2009135516 A1 | | 11/2009 | |
| WO | WO2011042847 A2 | | 4/2011 | |

OTHER PUBLICATIONS

Qualcomm Europe: "UE-RS Patterns for LTE-A", 3GPP Draft; R1-093105, No. Shenzhen, China; Aug. 19, 2009, Aug. 19, 2009 (Aug. 19, 2009), XP050351482, France [retrieved on Aug. 19, 2009].

International Search Report and Written Opinion—PCT/US2011/035246—ISA/EPO—Oct. 10, 2011.

Samsung: "Discussion on DMRS OCC Sequence Mapping across OFDM symbols", 3GPP Draft; R1-102189, 3rd Generation Partnership Project (3GPP), Mobile Competence Centre ; 650, Route Deslucioles ; F-06921 Sophia-Antipolis Cedex; France, vol. RAN WG1, No. Beijing, china; Apr. 12, 2010, Apr. 6, 2010 (Apr. 6, 2010), XP050419468, [retrieved on Apr. 6, 2010].

Qualcomm Europe: "Precoding Structure for DL MIMO—Further Aspects", 3GPP TSG-RAN WG1#47,R1-063438,Nov. 10, 2006.

Samsung, ZTE, ETRI,Codebook design for 4Tx SU MIMO,3GPP TSG-RAN WG1 Meeting #49,May 7, 2007,R1-072235.

NTT DOCOMO: et al., "Downlink DM-RS Design for LTE-Advanced", R1-094338, 3GPP tsg ran wg1 Meeting #58bis, Miyazaki, Japan, Oct. 12-16, 2009, pp. 1-5.

NTT DOCOMO ., et al., "Remaining Issues for Rel. 9 Downlink DM-RS Design," R1-094337, 3GPP TSG RAN WG1 Meeting #58bis, Miyazaki, Japan, Oct. 12-16, 2009, pp. 5 pages.

* cited by examiner

1002

$$\begin{bmatrix} +1 & +1 & +1 & +1 & +1 & +1 & +1 & +1 \\ +1 & +j & -1 & -j & +1 & +j & -1 & -j \\ +1 & -1 & +1 & -1 & +1 & -1 & +1 & -1 \\ +1 & -j & -1 & +j & +1 & -j & -1 & +j \\ +1 & +1 & +1 & +1 & -1 & -1 & -1 & -1 \\ +1 & +j & -1 & -j & -1 & -j & +1 & +j \\ +1 & -1 & +1 & -1 & -1 & +1 & -1 & +1 \\ +1 & -j & -1 & +j & -1 & +j & +1 & -j \end{bmatrix}$$

1004

$$\begin{bmatrix} +1 & +1 & +1 & +1 & +1 & +1 & -1 & -1 \\ +1 & +j & -1 & -j & +1 & +j & +1 & +j \\ +1 & -1 & +1 & -1 & +1 & -1 & -1 & +1 \\ +1 & -j & -1 & +j & +1 & -j & +1 & -j \\ +1 & +1 & +1 & +1 & -1 & -1 & +1 & +1 \\ +1 & +j & -1 & -j & -1 & -j & -1 & -j \\ +1 & -1 & +1 & -1 & -1 & +1 & +1 & -1 \\ +1 & -j & -1 & +j & -1 & +j & -1 & +j \end{bmatrix}$$

FIG. 10

METHOD AND APPARATUS FOR OPTIMIZING POWER DISTRIBUTION BETWEEN SYMBOLS

CROSS-REFERENCE TO RELATED APPLICATIONS

This application claims the benefit of U.S. Provisional Application Ser. No. 61/331,360, entitled "Method and Apparatus that Facilitates a Phase Rotation of a Pre-coding Matrix" and filed on May 4, 2010, and U.S. Provisional Application Ser. No. 61/332,673, entitled "Method and Apparatus that Facilitates a Mapping of Orthogonal Cover Codes" and filed on May 7, 2010, which are expressly incorporated by reference herein in their entirety.

BACKGROUND

Field

The present disclosure relates generally to communication systems, and more particularly, to an apparatus and method to facilitate transmit power equalization between symbols communicating reference signals within resource blocks (RBs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. These improvements may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects of the disclosure may relate to the application of pre-coding matrices and orthogonal code covers (OCCs) to references signals communicated within a RB. These aspects may also include methods to optimize transmit power equalization between different OFDM symbols communicating the reference signals. These various aspects may include, but are not limited to, modifying the pre-coding matrix to adjust the phase of one or more beamforming vectors within the pre-coding matrix, and applying a modified OCC scheme to the reference signals.

According to one aspect, a method for wireless communication is provided. The method may include determining a first pre-coding matrix for use on a portion of a set of RBs, wherein the first pre-coding matrix includes a set of beamforming vectors. The method may include modifying at least one beamforming vector of the set of beamforming vectors by applying a phase rotation to generate a modified pre-coding matrix. The method may include applying the modified pre-coding matrix to one or more demodulation reference signals and data associated with the portion of the set of RBs for transmission using at least one antenna.

Still another aspect relates to a computer program product comprising a computer-readable storage medium. The computer-readable storage medium may include instructions for causing a computer to determine a first pre-coding matrix for use on a portion of a set of resource blocks (RBs), wherein the first pre-coding matrix includes a set of beamforming vectors. The computer-readable storage medium may further include instructions for causing the computer to modify at least one beamforming vector of the set of beamforming vectors by applying a phase rotation to generate a modified pre-coding matrix. The computer-readable storage medium may further include instructions for causing the computer to apply the modified pre-coding matrix to one or more demodulation reference signals and data associated with the portion of the set of RBs for transmission using at least one antenna.

Another aspect relates to an apparatus for wireless communication. The apparatus may include means for determining a first pre-coding matrix for use on a portion of a set of resource blocks (RBs), wherein the first pre-coding matrix includes a set of beamforming vectors. Further, the apparatus may include means for modifying at least one beamforming vector of the set of beamforming vectors by applying a phase rotation to generate a modified pre-coding matrix. The apparatus may include means for applying the modified pre-coding matrix to one or more demodulation reference signals and data associated with the portion of the set of RBs for transmission using at least one antenna.

Yet another aspect relates to an apparatus for wireless communication. The apparatus may include at least one processor configured to determine a first pre-coding matrix for use on a portion of a set of resource blocks (RBs), wherein the first pre-coding matrix includes a set of beamforming vectors. Further, the at least one processor may be configured to modify at least one beamforming vector of the set of beamforming vectors by applying a phase rotation to generate a modified pre-coding matrix. The at least one processor may be configured to apply the modified pre-coding matrix to one or more demodulation reference signals and data associated with the portion of the set of RBs for transmission using at least one antenna. The apparatus may further include memory coupled to the at least one processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is an illustration of two pre-coding matrices according to an aspect.

DETAILED DESCRIPTION

Figure 1:
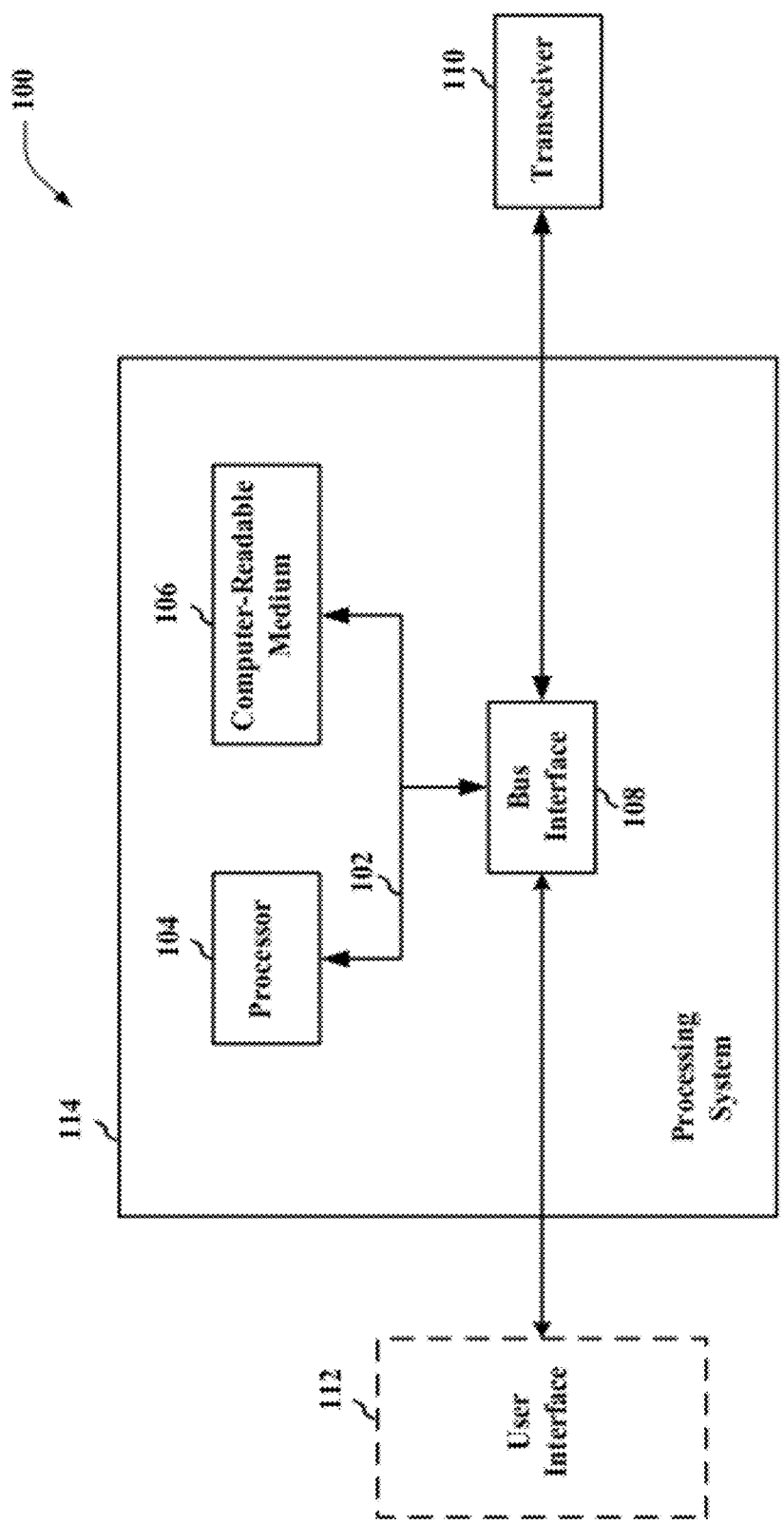
FIG. 1 is a diagram illustrating a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may reside in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by a bus 102. The bus 102 may include any number of interconnecting buses and bridges depending on the specific application of the processing system 114 and the overall design constraints. The bus 102 links together various circuits including one or more processors, represented generally by a processor 104, and computer-readable media, represented generally by a computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
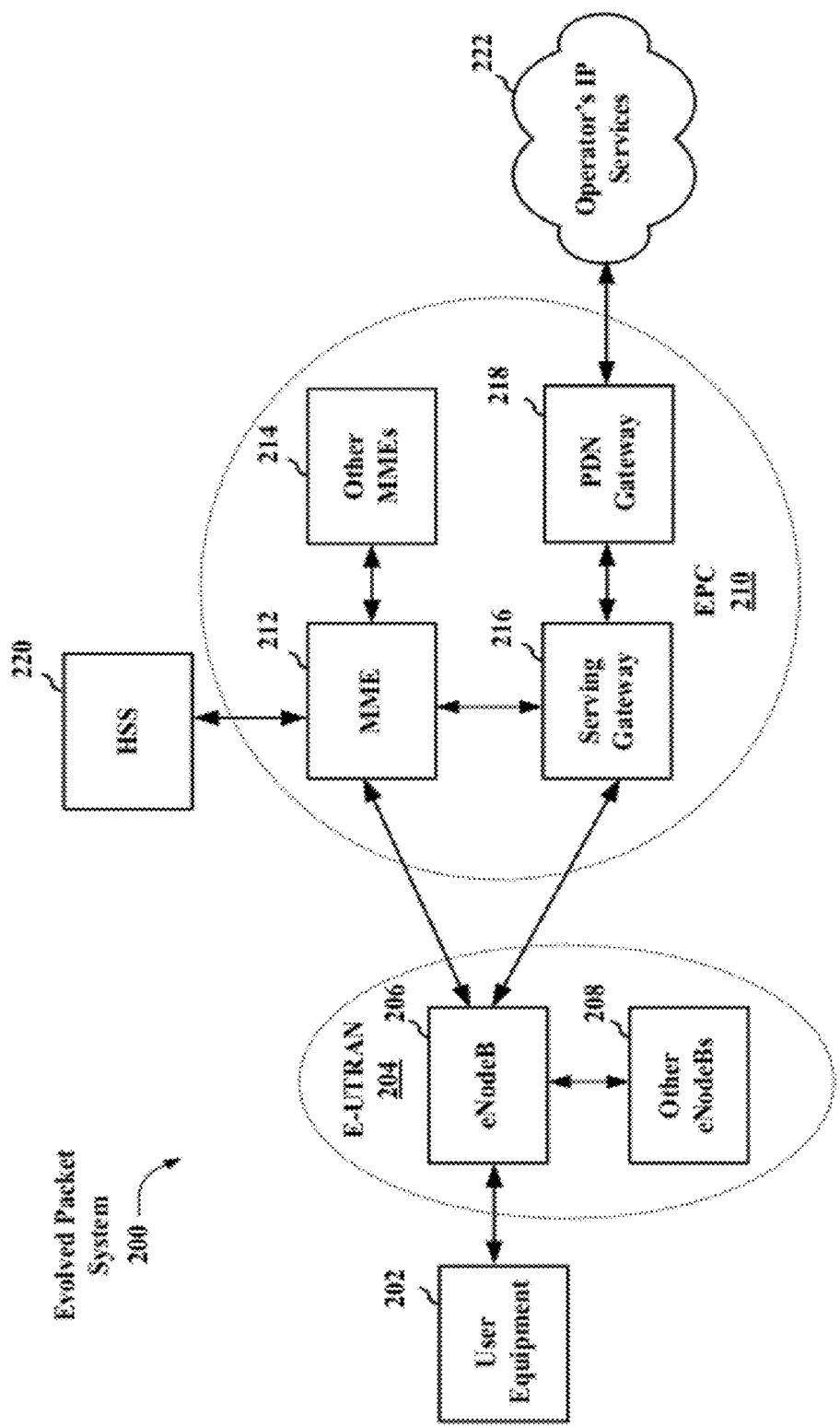
FIG. 2 is a diagram illustrating a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a tablet, a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
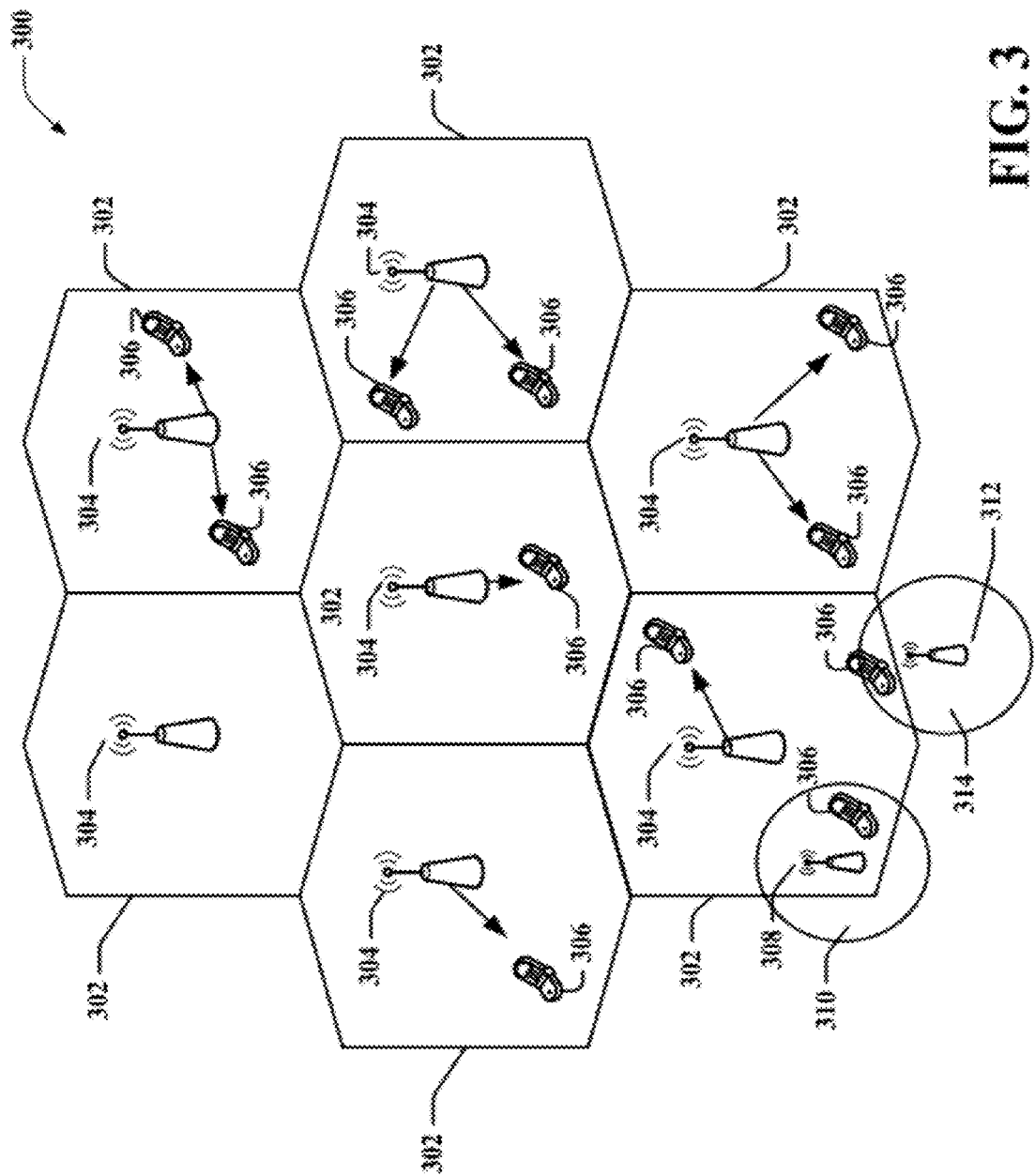
FIG. 3 is a diagram illustrating an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints of the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially pre-coding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
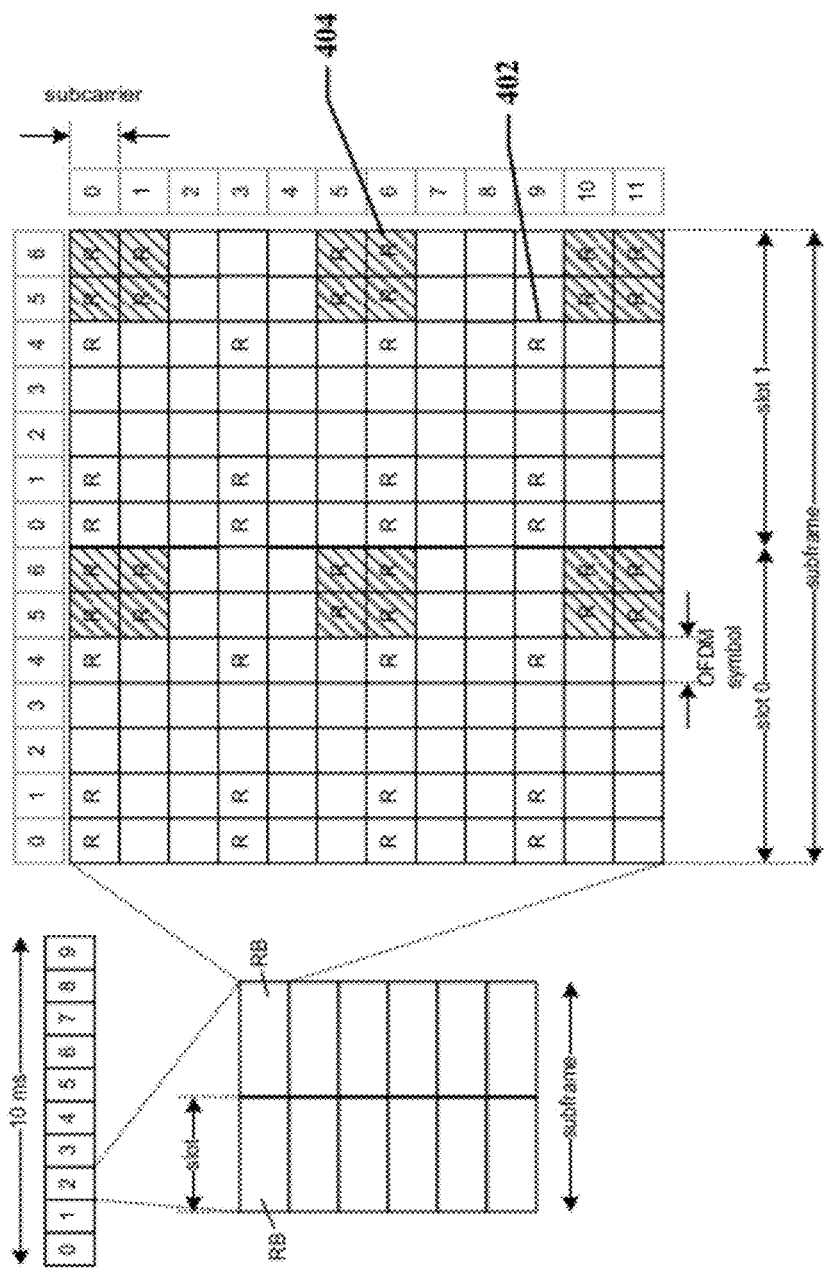
FIG. 4 is a diagram illustrating a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also called common RS) 402 and UE-specific RS (UE-RS) (also called demodulation RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
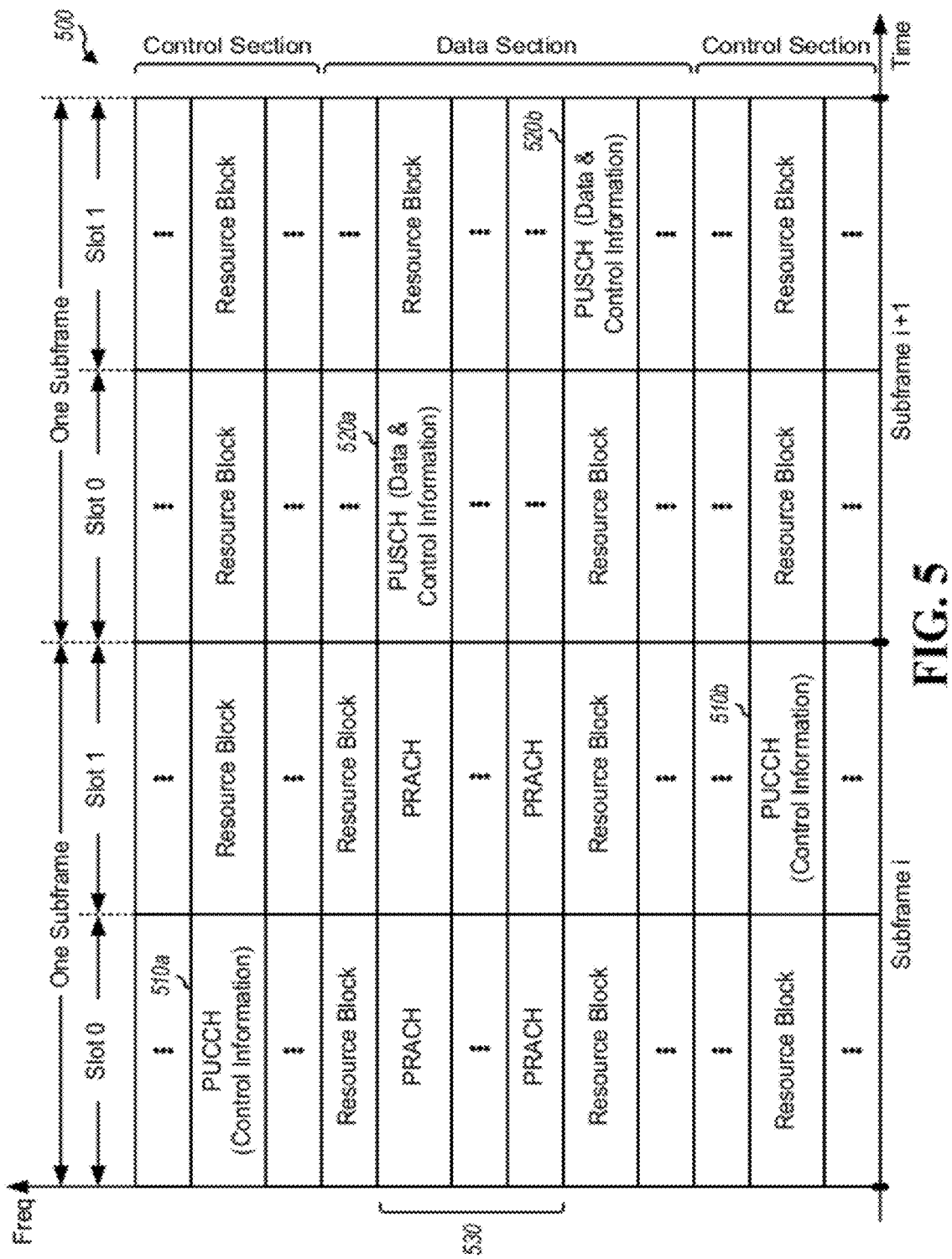
FIG. 5 shows an exemplary format for the uplink (UL) in LTE.

An example of a UL frame structure 500 will now be presented with reference to FIG. 5. FIG. 5 shows an example format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a sub-frame and may hop across frequency. A set of resource blocks may be used to perform initial system access and achieve UL synchronization in a physical random access channel (PRACH) 530. The PRACH 530 carries a random sequence and cannot carry any UL data/signaling.

Figure 6:
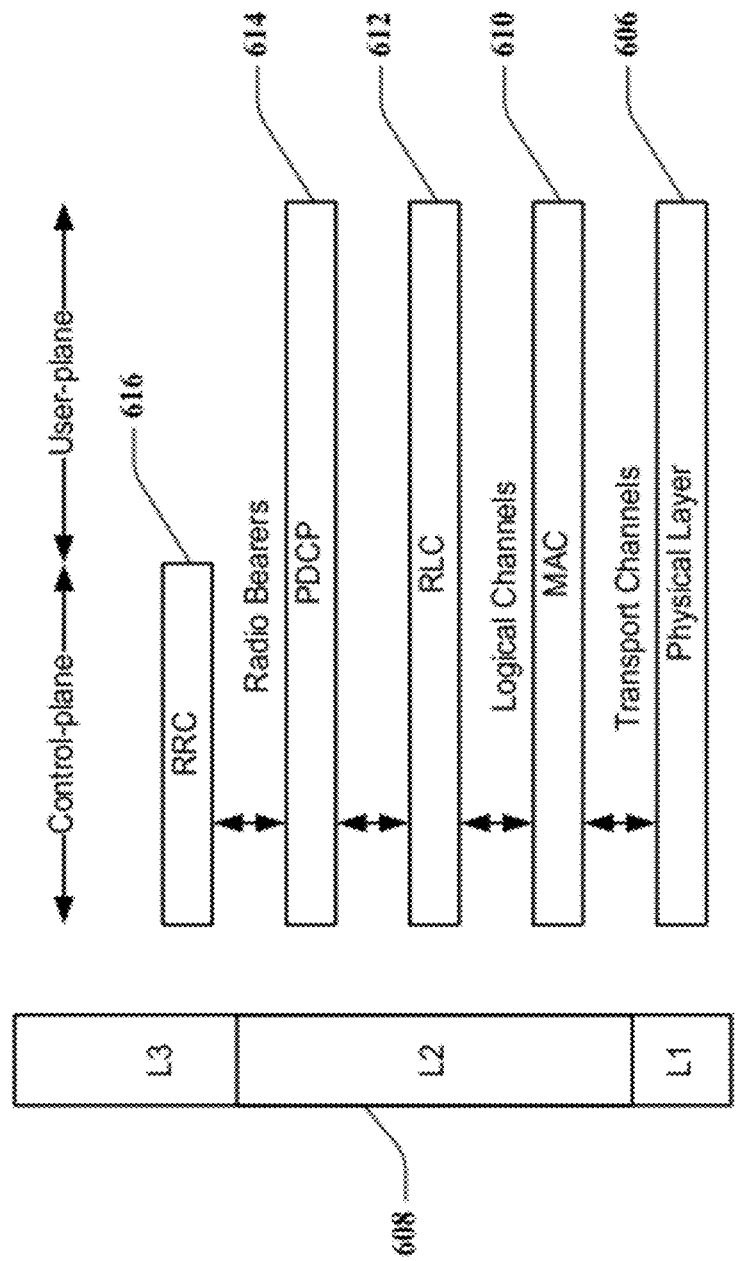
FIG. 6 is a diagram illustrating a radio protocol architecture for the user and control plane.

Referring to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
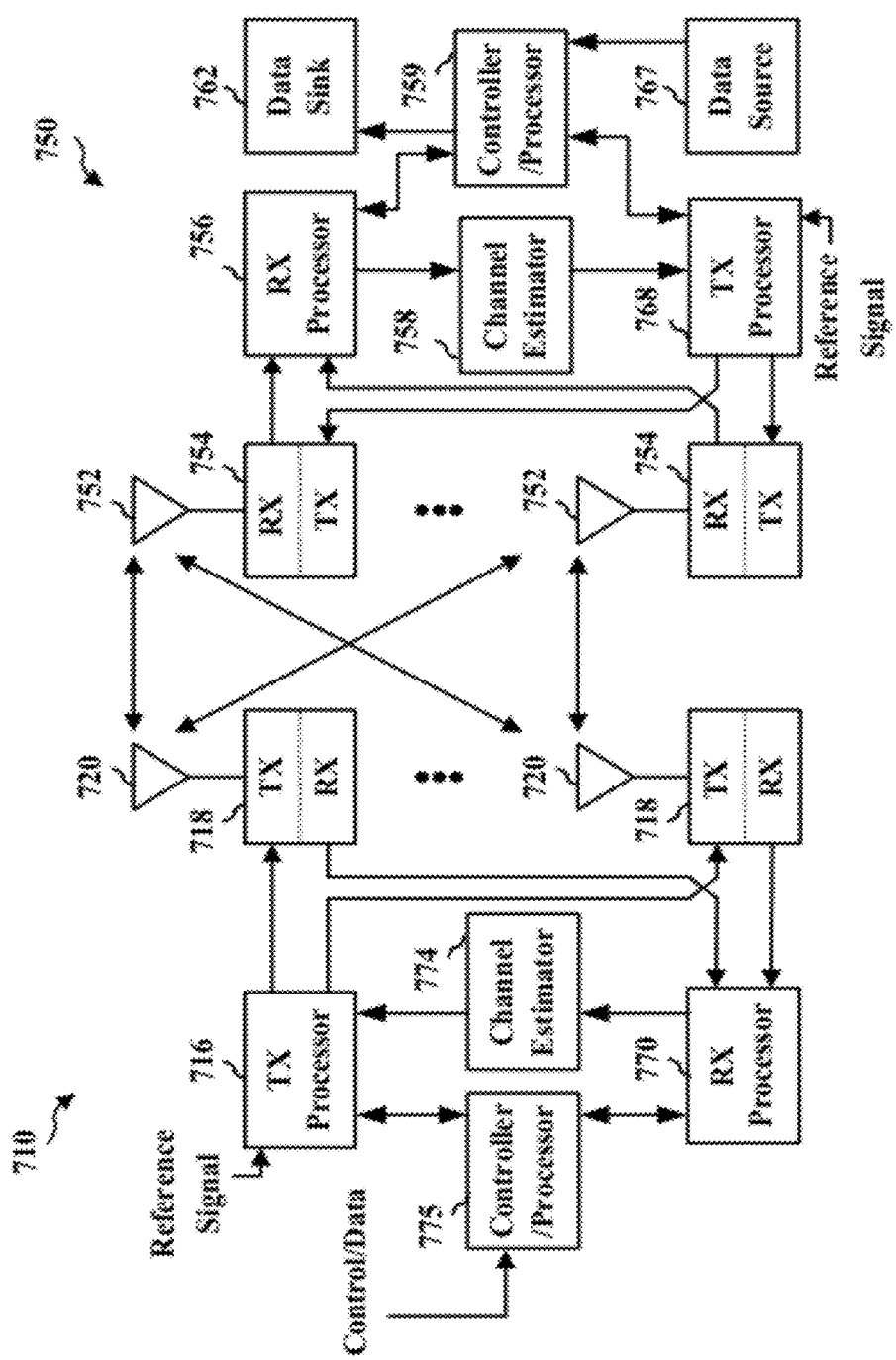
FIG. 7 is a diagram illustrating an evolved Node B (eNB) and user equipment (UE) in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 114 described in relation to FIG. 1 includes the eNB 710. In particular, the processing system 114 includes the TX processor 716, the RX processor 770, and the controller/processor 775.

Figure 8:
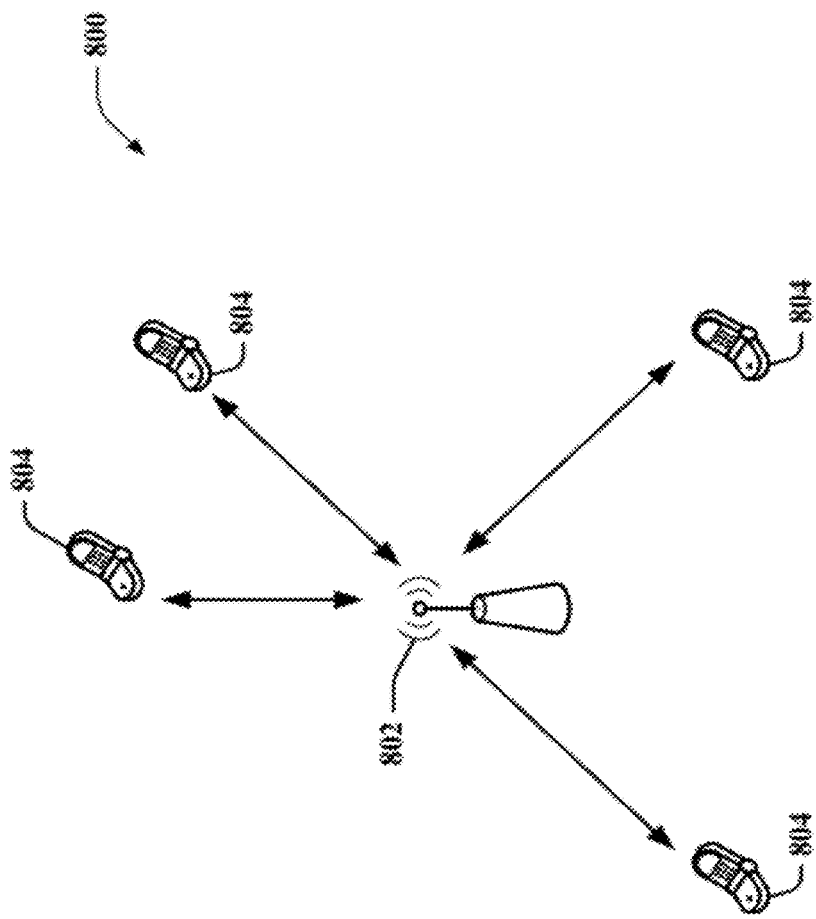
FIG. 8 is a diagram illustrating an access network implementing OFDM symbol power equalization according to an aspect.

FIG. 8 illustrates a wireless network environment 800, in which one or more UEs 804 may communicate with an eNB 802 and/or other UEs 804 through the eNB 802. In an LTE based environment, UE specific demodulation reference signals (UE-RS) are used to assist in facilitating communications. The UE-RS pattern in a normal sub-frame, for rank up to 8, has been agreed upon in the current standard. Generally, maintaining and/or obtaining power equalization and/or optimization across UE-RSs may be desired. As discussed with reference to FIGS. 9-15, various designs are presented to equalize and/or optimize power across UE-RSs.

Figure 9:
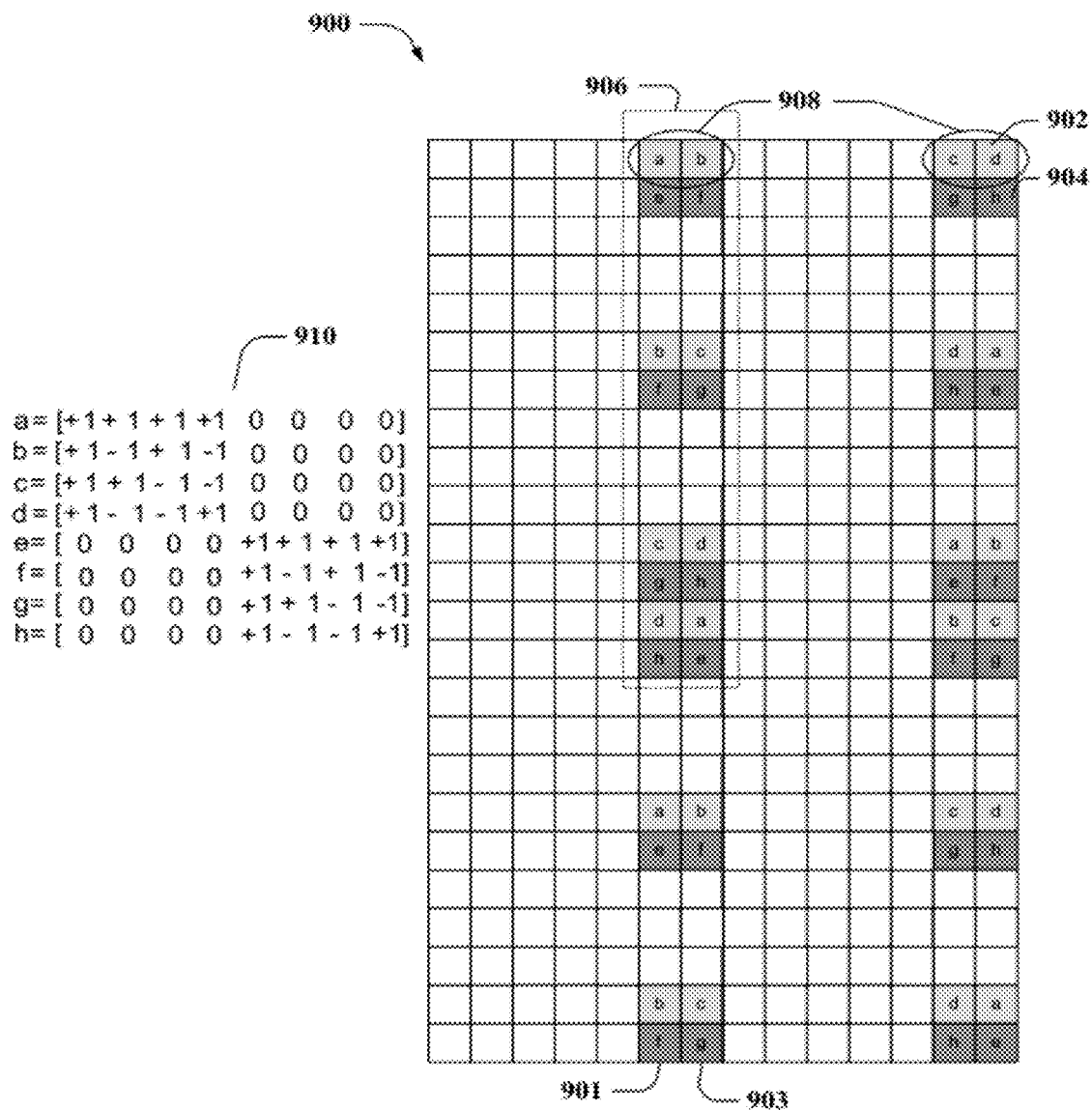
FIG. 9 is an illustration of a reference signal pattern according to an aspect.

FIG. 9 illustrates a hybrid CDM (code division multiplexing)/FDM (frequency division multiplexing) pattern 900. In one aspect, the pattern may be used in LTE-Advanced (LTE-A) systems for UE-specific reference signals (UE-RS, which is occasionally interchangeable with demodulation reference signal "DM-RS" herein). Each column represents an OFDM symbol. The pattern includes multiple RBs in which reference signal REs (901, 903) are distributed at locations within the RBs. The reference signals (901, 903) may be grouped into different code division multiplexed (CDM) groups (902, 904). For rank 1 and 2 only the UE-RS REs corresponding to the first CDM group 902 may be used for pilots (e.g., UE-RSs). In such an aspect, the REs for the $2^{nd}$ CDM group 904 may be used for data. In operation, for rank 2, the pilots for the two layers are sent using CDM over two contiguous REs in time 908 and hence the pilots for the two layers can be orthogonalized by despreading over the two contiguous REs in time. For ranks 3 and 4 both CDM groups may be used for pilots with CDM group 1 (902) being used for pilots of two layers and CDM group 2 (904) being used for pilots of the remaining one or two layers. The pilots can be orthogonalized in this case also by CDM despreading over two contiguous REs in time 908. For rank 5-8 the reference signal pattern may include two CDM groups 908, with code division multiplexing of up to four layers over the 4 REs in a group using despreading over 4 REs in time to orthogonalize the pilots. Further, reference signals REs may be organized in a repeating pattern (906). In the depicted aspect, the OCC 910 has elements (a,b,c,d, e,f,g,h) and accompanying vector values for each layer (e.g., for layer 1 [a,b,c,d,e,f,g,h]=[1,1,1,1,0,0,0,0], for layer 2 [a,b,c,d,e,f,g,h]=[1, −1, 1, −1,0,0,0,0], etc.). Here, it is noted that the cover code may alternate with frequency to reduce the peak power used by the UE-RS (901, 903). Additionally, for rank 5-8, the layer values may start with zeros (e.g., for layer 5 [a,b,c,d,e,f,g,h]=[0,0,0,0,1,1,1,1]). On an RE that is indicted to include an 'a' OCC, the transmit signal may be defined as P $a^T$ (where $a^T$ is transpose(a) and P is the pre-coding matrix). Similarly on an RE that is indicated to include a 'b' OCC transmit signal is P $b^T$.

FIG. 10 illustrates example pre-coding matrices (1002, 1004) that may be used to facilitate transmit power balancing between OFDM symbols. In one aspect, equalizing power between OFDM symbols assists with reducing peak power consumption. In the depicted aspect, the second pre-coding matrix 1004 is obtained by applying a phase shift to the last two columns of the first pre-coding matrix 1002. In other words, the phase of pre-coding matrix vectors may be chosen to minimize peak power.

Generally, with respect to determining a pre-coding matrix, a pre-coding matrix P may be assumed with $N_{Tx}$ rows and R columns, where $N_{Tx}$ is the number of transmit antennas and R is the number of contemporaneously transmitted spatially separated data streams (e.g., the transmission rank). For UE-RS based transmissions precoded pilots may also be sent for the R layers. In case of the hybrid FDM/CDM UE-RS pattern described above, the R layers may be split between the different CDM groups. Note that the columns of P may be orthogonal depending on whether a SU-MIMO or MU-MIMO transmission mode is used.

Further, M may be a vector describing the per layer OCC (910) allocation within a given OFDM symbol. Additionally, the same equations may apply for each OFDM symbol separately but with different M matrices in each symbol. M may have R rows and Q columns, where Q corresponds to the number of REs over which power distribution may be optimized. For example, if power distribution is optimized over URBs then Q=3×U. Each CDM group may be counted separately and may be optimized separately.

Further, pre-coding vector $p_i$ corresponds to the $i^{th}$ transmit antenna (e.g., $p_i$ is the $i^{th}$ row of P).

As such, the DM-RS signal on each RE in an OFDM symbol carrying DM-RS in the $1^{st}$ CDM group on the $i^{th}$ transmit antenna may be written as a row vector $s_i$ where $s_i=s_i=p_i\cdot M$. And the sum power $s_i$ of the $i^{th}$ transmit antenna in the first CDM group over URBs is equation (1).

$$S_i=s_i\cdot s_i{}^*=(p_i\cdot M)\cdot(p_i\cdot M)^*=p_i(M\cdot M^*)\cdot p_i{}^* \quad (1)$$

Equation (1), written in a balanced power form (e.g., M·M*=I where M is ortho-normal) can be expressed as equation (2).

$$S_i=p_i(M\cdot M^*)\cdot p_i{}^*=p_i\cdot p_i{}^* \quad (2)$$

Additionally, the OCC elements in the frequency domain also form orthogonal vectors when collecting elements per layer. Note that when M·M*≠I, rotation of the layers can still help balancing per symbol power.

In one aspect, Q may be a multiple of the frequency domain spreading length over which the OCC sequences are orthogonal in frequency across layers to ensure M·M*=I. For example, with OCC with QPSK elements, Q may be the least multiple of 3 and 4, and, as such, balancing can be achieved over 4 RBs.

Note that pre-coding matrix 1004 was obtained from 1002 by multiplying the last two columns by −1. Such a multiplication may not impact a UE since data continues to be precoded using the same direction. Also phase shift may be transparent to the UE since the UE decodes the data using channels estimated from the demodulation reference signals, which are also precoded using the same pre-coding matrix. In one aspect, if no bundling is used, then a different phase rotation may be applied on each RB. Additionally, with bundling, different phase rotations may be applied across RBs that are not bundled. As used herein, RBs are said to be bundled if a receiver can assume that the same pre-coding matrix is used on the RBs if they are both allocated to the receiver. Additionally, in one aspect, which RBs are to be bundled may be defined in a specification associated with the wireless network (e.g., LTE Release 10 defines which REs are to be bundled).

Figure 11:
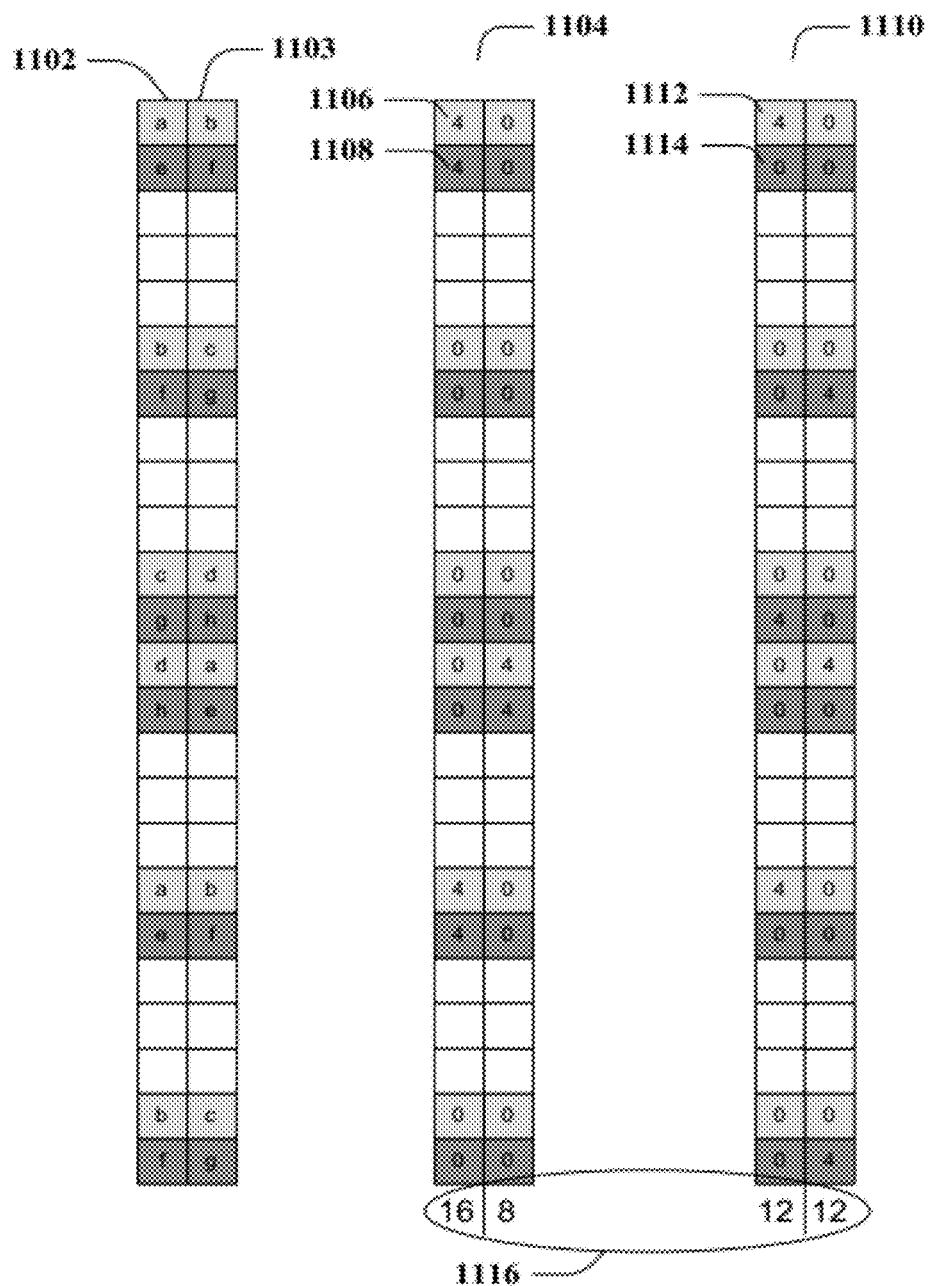
FIG. 11 is an illustration of a pre-coding matrix rotation according to an aspect.

FIG. 11 illustrates an example application of phase shifted pre-coding matrices to 2 RB OFDM symbols. Two OFDM symbols (1102, 1103) are depicted (e.g., symbols 901 and 903 from FIG. 9) with OCCs 910 (a, b, c, d) associated with a first CDM group (e.g., CDM group 902) and OCCs 910 (e, f, g, and h) associated with a second CDM group (e.g., CDM group 904). In one aspect, pre-coding matrix 1002 may be applied to the two OFDM symbols 1104 resulting power values for each reference signal RE. For example, consider the signal corresponding to the first transmit antenna which may be obtained by multiplying the OCC mapping with the first row of the pre-coding matrix (e.g., 1002, 1004). On a first RE OCC a for CDM group 1 (e.g., a=1,1,1,1,0,0,0,0) may be multiplied by the first row of pre-coding matrix 1002 (1,1,1,1,1,1,1,1) to produce a value of 4 (1106) as the transmit signal on the first Tx Antenna. Additionally, on a second RE, OCC e for CDM group 2 (e.g., e=0,0,0,0,1,1,1,1) may be may be multiplied by the first row of pre-coding matrix 1002 (1,1,1,1,1,1,1,1) to also produce a value of 4 (1108) for the first Tx Antenna. In another aspect, pre-coding matrix 1004 may be applied to the two OFDM symbols 1110 resulting power values for each reference signal RE. For example, on a first RE, OCC a for CDM group 1 (e.g., a=1,1,1,1,0,0,0,0) may be multiplied by the first row of pre-coding matrix 1004 (1,1,1,1,1,1,−1,−1) to produce a value of 4 (1112). Additionally, on a second RE, OCC e for CDM group 2 (e.g., e=0,0,0,0,1,1,1,1) may be may be multiplied by the first row of pre-coding matrix 1004 (1,1,1,1,1,1,−1,−1) to produce a value of 0 (1114).

In operation, application of a phase shifted pre-coding matrix may equalize power between different OFDM symbols. For example, the summation 1116 of the first column of the pair of OFDM symbols 1104 results in a value of 16, and the summation 1116 of the second column of the pair of OFDM symbols 1104 results in a value of 8. Additionally, for example, the summation 1116 of the first column of the pair of OFDM symbols 1110 results in a value of 12, and the summation 1116 of the second column of the pair of OFDM symbols 1110 also results in a value of 12. For other transmit antennas, power may also be equalized to 12 per 2 RB per OFDM symbol. In general, a phase rotation of a pre-coding matrix may consider the peak power usage across all transmit antennas.

Figure 12:
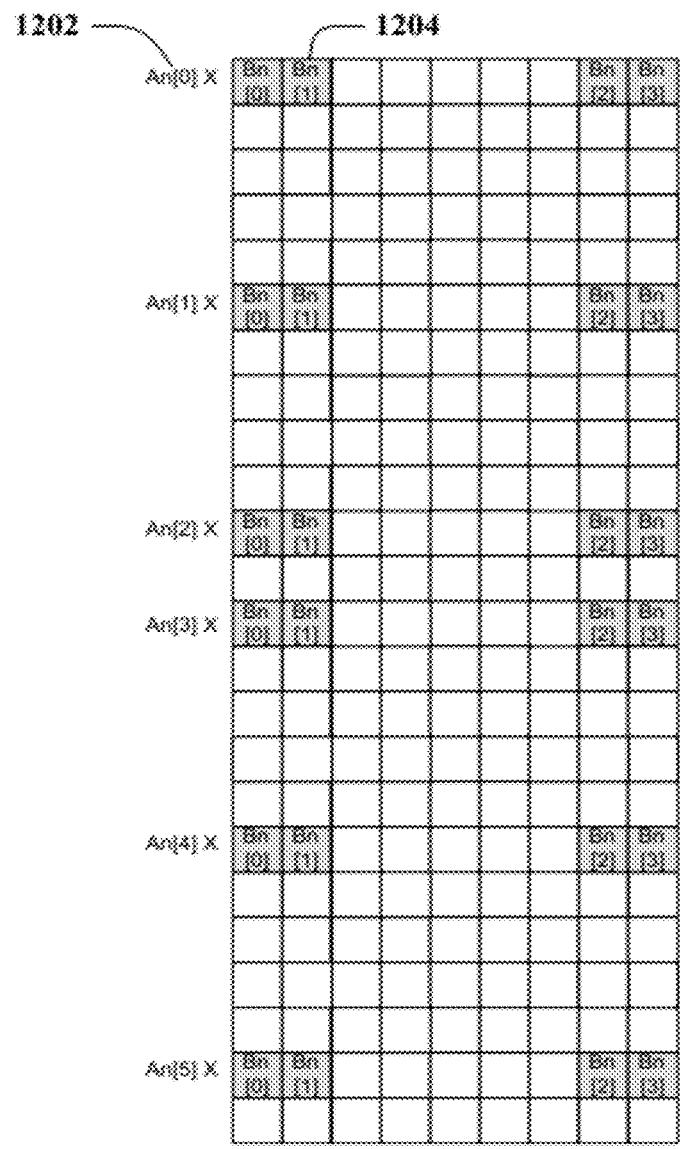
FIG. 12 is an illustration of a cover code mapping according to an aspect.

FIG. 12 illustrates an example application of OCCs to reference signals. Generally, various factors may affect OCC design. For example, peak power randomization and performance in a high Doppler environment. With respect to peak power randomization, if the same OCCs were used for the all symbols and if wideband pre-coding were employed, then the same combination of pre-coding vectors may be transmitted on all the UE-RS REs in a symbol. Such a design would result is a large peak to average ratio when compared with a scheme in which several different combinations of the pre-coding vectors are transmitted. With respect to high Doppler environment performance, since UE-RS patterns may employ CDM in time, the layers remain orthogonal at low mobility (e.g., when the channel does not vary significantly with time). At high Doppler (e.g., when the channel vary significantly with time) the orthogonality may be lost. For rank less than or equal to 4, for the UE-RS pattern in FIG. 9, the CDM is over two contiguous REs (e.g., as depicted by element 908) and, as such, may not be significantly impacted by time variations in a channel (e.g., for example due to high Doppler). However, for rank greater than 4 the CDM is over four non-contiguous REs. Such a design may leads to loss in orthogonality even in moderate Doppler environments. UE-RS for rank greater than 4 may generally not be used in an environment with even moderate Doppler, but OCC design may still assist in providing improved orthogonalization. OCC design may assist with other design considerations, such as inter-tone interference suppression between CDM groups, backwards compatibility, etc. In one aspect, spreading and scrambling sequences may use QPSK alphabets {1, −1, j, −j} to keep complexity low.

The OCC for layer/antenna port n may be described by a Kronecker product of two vectors. For example, FIG. 12 depicts OCC mapping for a first CDM group. The first vector $A_n$ is a 6×1 column vector of a scrambling sequence matrix (as depicted in Table 1), the second vector $B_n$ is a 1×4 row vector of a spreading sequence matrix (as depicted in Table 2). The OCC for port n mapped in a two dimensional frequency-time grid may be given as $A_n \otimes B_n$. In FIG. 12, elements of vector $A_n$ are depicted as 1202, and elements of vector $B_n$ are depicted as 1204. In one example aspect, the scrambling sequences shown in Table 1 may provide two dimensional orthogonality for sequences within a group that have poor time domain orthogonality.

TABLE 1

Frequency domain OCC component $A_n$ (scrambling sequence)

| $A_1$ | $A_2$ | $A_3$ | $A_4$ |
| --- | --- | --- | --- |
| +1 | +1 | +1 | +1 |
| +1 | −1 | −1 | +1 |
| +1 | +1 | +1 | +1 |
| +1 | −1 | +1 | −1 |
| +1 | +1 | −1 | −1 |
| +1 | −1 | +1 | −1 |

TABLE 2

Time domain OCC component $B_n$ (OCC spreading sequence)

| $B_1$ | +1 | +1 | +1 | +1 |
| --- | --- | --- | --- | --- |
| $B_2$ | +1 | −1 | +1 | −1 |
| $B_3$ | +1 | +1 | −1 | −1 |
| $B_4$ | +1 | −1 | −1 | +1 |

In operation, two groups of spreading sequences may be used (e.g., $G_1=\{B_1,B_3\}$ and $G_1=\{B_2,B_4\}$). For UE-RS patterns, such as depicted in FIG. 9, spreading over 4 REs in the time domain involves two groups of contiguous REs which are separated by several OFDM symbols (e.g., 6 OFDM symbols as depicted for the UE-RS pattern in FIG. 9). In operation, interference on a first layer with spreading sequence in $G_1$ from layers with spreading sequence in $G_2$, resulting from loss of orthogonality, due to the time variations of the channel, may be smaller than interference from the second layer in $G_1$. Similar conditions may be seen with respect to group $G_2$.

Assignments of scrambling sequences to spreading sequences can be performed taking into account differences in time domain orthogonality. For example, scrambling sequences A1 and A2 are orthogonal in frequency over any two neighboring frequencies while scrambling sequences A1 and A4 may be orthogonal when used separated over six frequencies. As such, A1 and A2 may be assigned to CDM layers with spreading sequences that have poor orthogonalization in time, such as B1 and B3. In another aspect, A4 may be assigned to other layers that have comparatively better orthogonalization in time with the spreading sequence, such as B2 or B4.

In one aspect, in which a legacy release of LTE is implemented, UE-RS patterns for rank 2 include assigning scrambling sequence A1 to spreading sequence B1 and scrambling sequence A2 to spreading sequence B2. In such an aspect, scrambling sequence A3 mat be assigned to spreading sequence B3 and scrambling sequence A4 may be assigned to spreading sequence B4. In such an aspect, A3 may provide better frequency domain orthogonalization with A1 than A4. In determining which scrambling sequence vector pairs to use to improve frequency domain orthogonalization, a first vector for a layer (n) (e.g., A1(n)) and the complex conjugate (e.g., "*") of a second vector for the layer (n) (e.g., *A3(n)) may be multiplied together and added to the same product for a different layer (n+1) (e.g., A1(n+1)*A3(n+1)). Where the sum of the different layer equals zero, orthogonality exists between those layers. In operation, when the above process is applied to the A1 and A3 pairing and the A1 and A4 pairing, the sum of the produce for the A1 and A3 pairing results in a zero value more often than the A1 and A4 pairing. Such an implementation may provide improved frequency orthogonalization between spreading sequences B1 and B3 that experience poor time domain orthogonalization. Additionally, such a mapping also provides improved frequency orthogonalization for spreading sequences B2 and B4 that also experience poor time domain orthogonalization.

Figure 13:
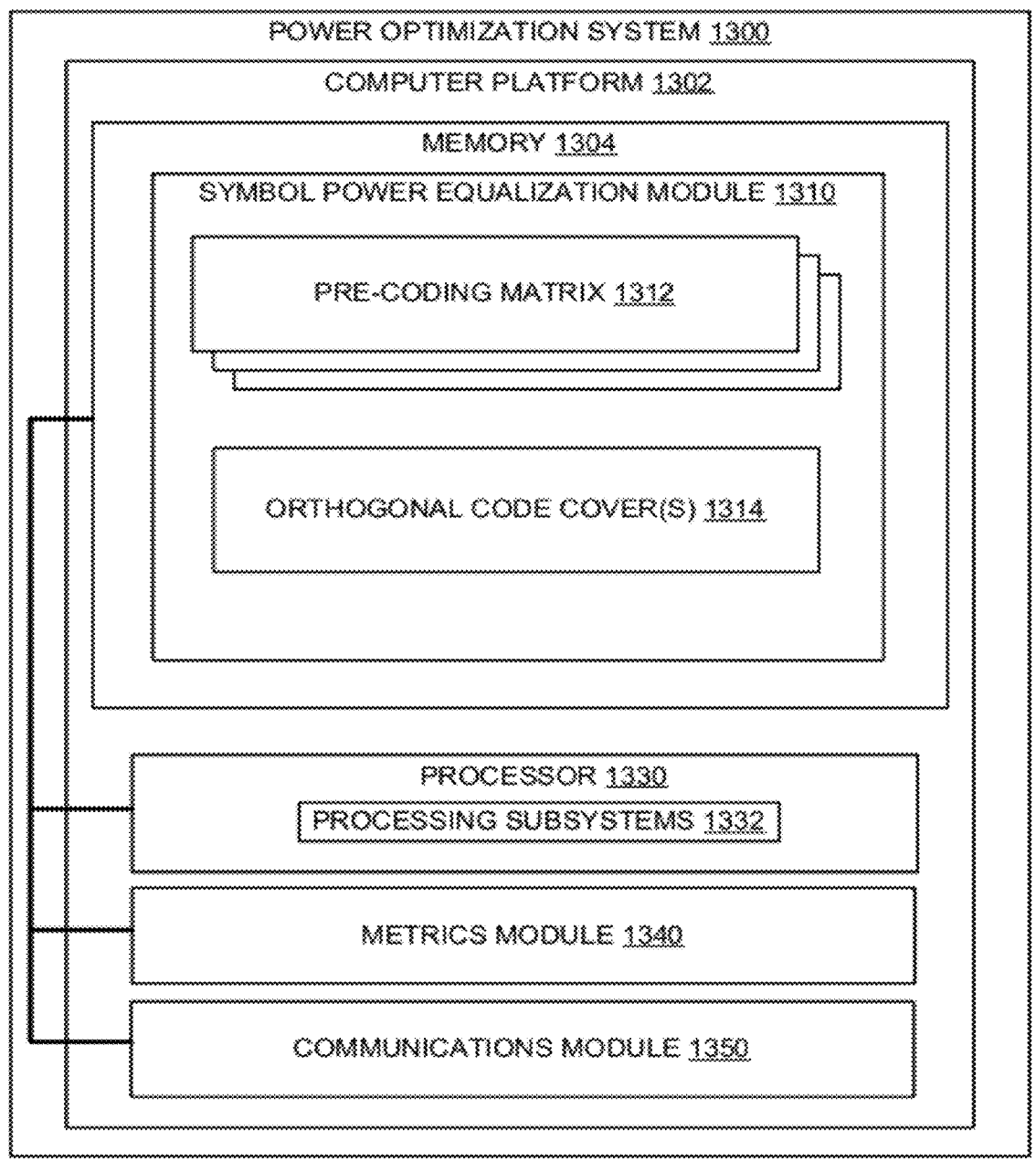
FIG. 13 is a block diagram of a power optimization system.

FIG. 13 illustrates a detailed block diagram of power optimization system 1300, such as eNB 204 depicted in FIG. 2. Power optimization system 1300 may include at least one of any type of hardware, server, personal computer, mini computer, mainframe computer, or any computing device either special purpose or general computing device. Further, the modules and applications described herein as being operated on or executed by power optimization system 1300 may be executed entirely on a single network device, as shown in FIG. 2, or alternatively, in other aspects, separate servers, databases or computer devices may work in concert to provide data in usable formats to parties, and/or to provide a separate layer of control in the data flow between communications devices 206 and the modules and applications executed by power optimization system 1300.

Power optimization system 1300 includes computer platform 1302 that can transmit and receive data across wired and wireless networks, and that can execute routines and applications. Computer platform 1302 includes memory 1304, which may include volatile and nonvolatile memory such as read-only and/or random-access memory (ROM and RAM), EPROM, EEPROM, flash cards, or any memory common to computer platforms. Further, memory 1304 may include one or more flash memory cells, or may be any secondary or tertiary storage device, such as magnetic media, optical media, tape, or soft or hard disk. Further, computer platform 1302 also includes processor 1330, which may be an application-specific integrated circuit ("ASIC"), or other chipset, logic circuit, or other data processing device. Processor 1330 may include various processing subsystems 1332 embodied in hardware, firmware, software, and combinations thereof, that enable the functionality of power optimization system 1300 and the operability of the system on a wired or wireless network.

In one aspect, processor 1330 may provide means for means for determining a first pre-coding matrix for use on at least a portion of a set of RBs. In one aspect, the first pre-coding matrix includes a set of beamforming vectors. Processor 1330 may also provide means for modifying at least one beamforming vector of the set of beamforming vectors by applying a phase rotation to generate a modified pre-coding matrix, and means for applying the modified pre-coding matrix to one or more demodulation reference signals and data associated with at least a portion of the set of RBs for transmission using at least one antenna.

Computer platform 1302 further includes communications module 1350 embodied in hardware, firmware, software, and combinations thereof, that enables communications among the various components of service provider system 1300, as well as between power optimization system 1300, devices 206, and eNBs 204. Communication module 1350 may include the requisite hardware, firmware, software and/or combinations thereof for establishing a wireless communication connection. According to described aspects, communication module 1350 may include hardware, firmware and/or software to facilitate wireless broadcast, multicast and/or unicast communication of requested content items, control information, etc.

Computer platform 1302 further includes metrics module 1340 embodied in hardware, firmware, software, and combinations thereof, that enables metrics received from device 206, eNB 204, etc., corresponding to, among other things, interference levels for data communicated with devices 206. In one aspect, power optimization system 1300 may analyze data received through metrics module 1340 to modify possible power optimization schemes for future communications with device 206. In one aspect metric module 1340 may measure channel information to assist in pre-coding matrix 1312 modification. In such an aspect, metrics module 1340 may measure information including, but is not limited to, channel quality indicator (CQI) feedback from one or more device 206, pre-coding matrix index (PMI) feedback from one or more deice 206, channel measurements, etc.

Memory 1304 of power optimization system 1300 includes symbol power equalization module 1310 operable to facilitate equalizing transmission power used for transmitting OFDM symbols. In one aspect, symbol power equalization module 1310 may include one or more pre-coding matrices 1312 and one or more OCC schemes 1314. In one aspect, symbol power equalization module 1310 may modify a pre-coding matrix 1312 to optimize transmission power distribution between OFDM symbols. In such an aspect, various beamforming vectors used to make up the pre-coding matrix may have a phase shift applied. For example, the last two columns (e.g., beamforming vectors) may be multiplied by a factor, such as negative one. In operation, as discussed above, with respect to FIG. 11, multiplying the last two vectors in a pre-coding matrix by negative one may equalize transmission power over OFDM symbols. In one aspect, pre-coding matrices may be stored in memory 1304. In another aspect, symbol power equalization module 1310 may modify a OCC schemes 1314 to optimize transmission power distribution between OFDM symbols. As discussed above, with respect to FIG. 12, various OCC mapping schemes may be used to in poor orthogonalization conditions.

Figure 14:
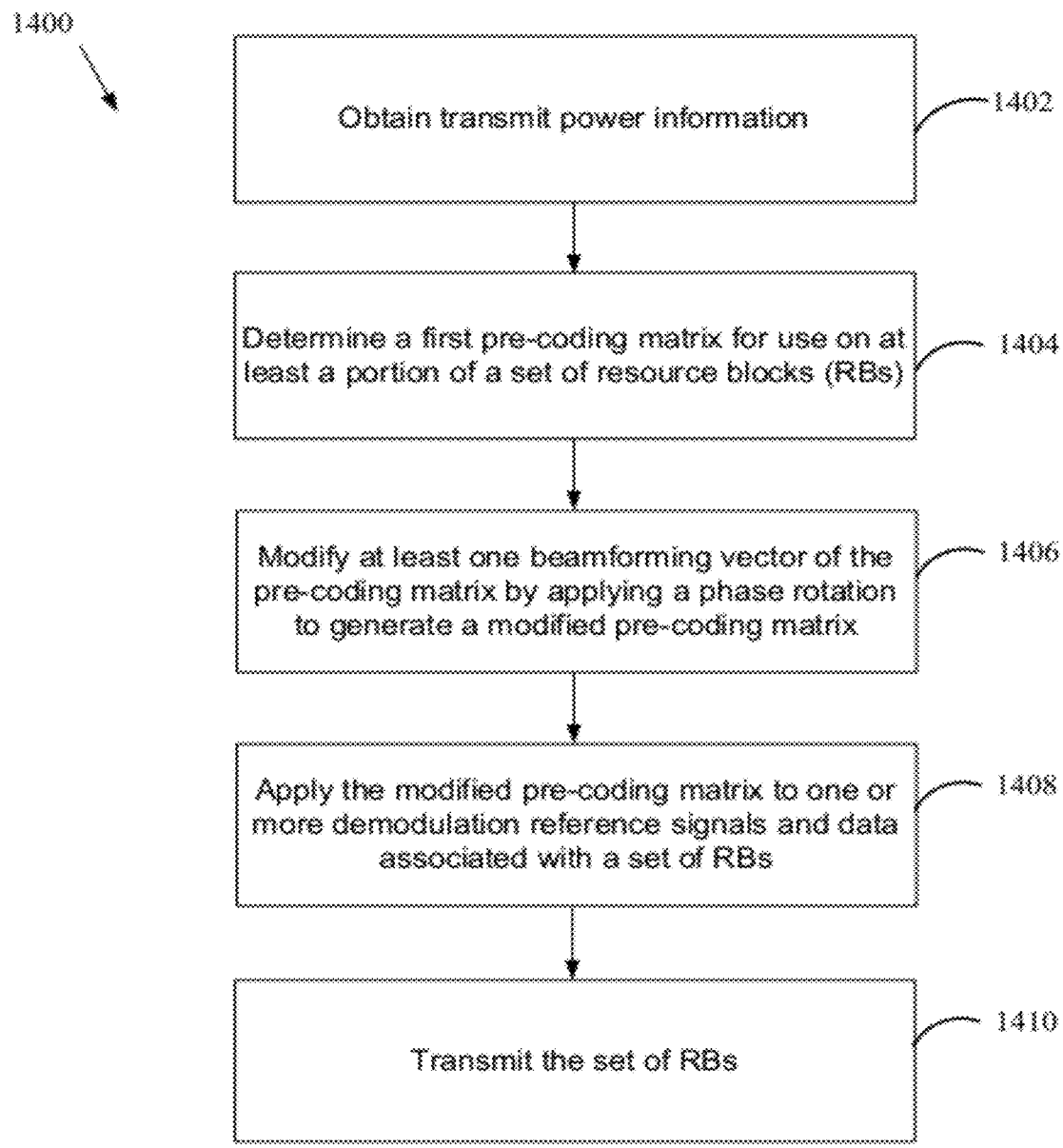
FIG. 14 is a flow chart of a method of wireless communication.

FIG. 14 is a flow chart 1400 of a method of wireless communication. The method may allow channel information associated with various UEs (e.g., UE 804) to be obtained in a wireless network (e.g., 800) (1402). In one aspect, the obtained information may include, but is not limited to, CQI feedback from one or more UEs, PMI feedback from one or more UEs, or channel measurements detected by a eNB, etc. In addition, the method includes determining a first pre-coding matrix for use on at least a portion of a set of resource blocks (RBs) (1404). In one aspect, the first pre-coding matrix may include a set of beamforming vectors. In one aspect, a pre-coding matrix may be obtained from a database associated with an eNB. Furthermore, the method includes modifying at least one beamforming vector of the set of beamforming vectors by applying a phase rotation to generate a modified pre-coding matrix (1406). In one aspect, the pre-coding matrix may be modified by selecting the phase rotation to reduce transmission power variations across two or more OFDM symbols. In another aspect, OFDM symbols may be used for communicating demodulation reference signals.

Further, the method includes applying the modified pre-coding matrix to one or more demodulation reference signals and data associated with at least a portion of the set of RBs for transmission using at least one antenna (1408). In one aspect, the RBs may be bundled. Bundled RBs are a set of RBs being used to transmit data to a device (e.g., UE 804) where the device assumes the same pre-coding matrix is used for the bundle of RBs. In one aspect, the bundled RBs may be located relatively close to each other. In such an aspect, the location of RBs may be determined, and the RBs may be selected for the bundle based on a relative distance between the locations of the RBs being below a bundling threshold. Further, a bundling threshold may define a number of RBs apart that RBs may be, and still be selected to be within the same RB bundle. In one aspect, RBs greater than 2 RBs apart may not be included within the same bundle. In another aspect, a standard defining communication protocols for an applicable wireless protocol may define which RBs may be bundled. In operation, bundling allows the device to jointly estimate the channel across the RBs in the bundle and, as such, improve channel estimation performance. In another aspect, two or more demodulation reference signals may be grouped into two or more CDM groups. In such an aspect, different OCCs may be applied to different CDM groups.

Moreover, the method may include transmitting the demodulation reference signals and data (1410). In one aspect, where transmission conditions result in poor time domain orthogonalization between reference signals, spreading sequences associated with the reference signals may be selected to reduce such poor orthogonalization affect. In other words, where reference signal spacing in a time domain experience poor orthogonalization, due to various conditions, such as high UE mobility, etc., spreading sequences in the frequency domain may be selected to group reference signals to reduce impact due to variations of the channel in the time domain.

Figure 15:
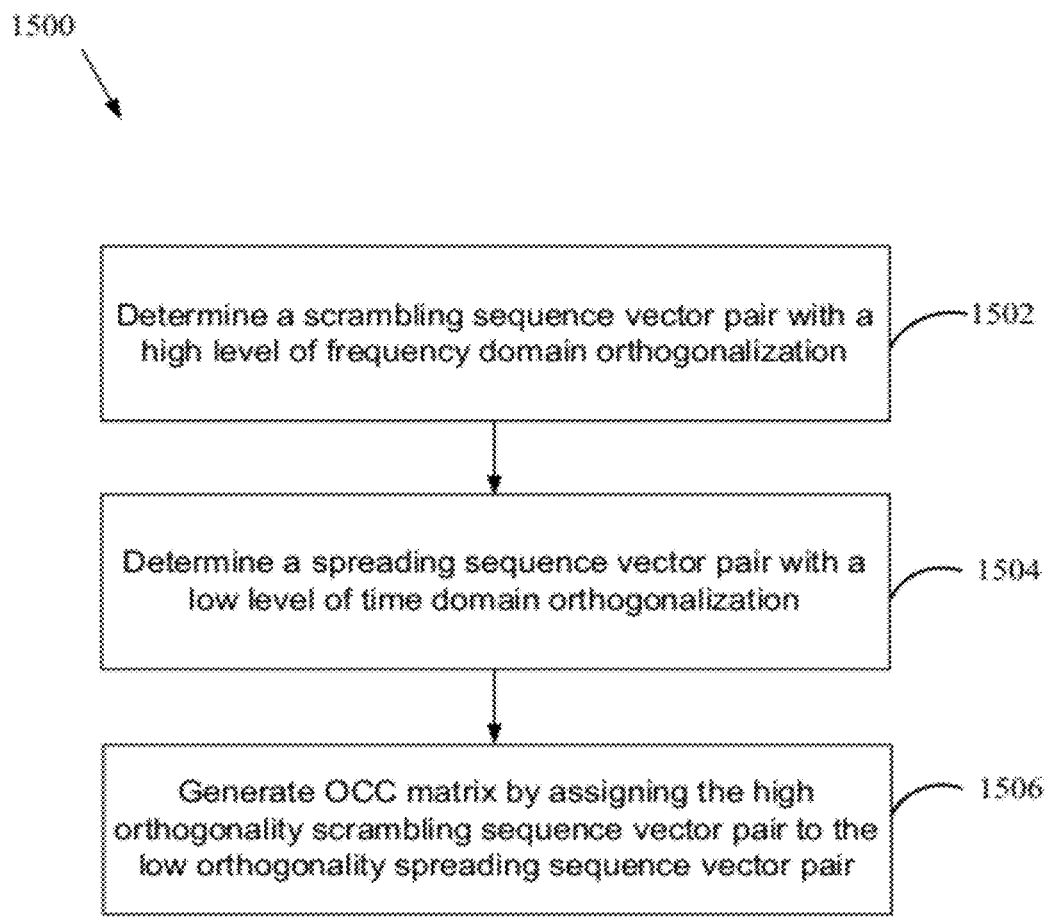
FIG. 15 is a flow chart of another method of wireless communication.

FIG. 15 is a flow chart 1500 of a method of wireless communication. The method may allow frequency domain orthogonality to be determined for one or more scrambling sequence vector pairs (1502). In one aspect, the one or more scrambling sequence vector pairs may be associated with a scrambling sequence matrix, such as described with reference to Table 1. The method may also allow time domain orthogonality to be determined for one or more spreading sequence vector pairs (1504). In one aspect, the one or more spreading sequence vector pairs may be associated with a spreading sequence matrix, such as described with reference to Table 2. The method may further allow an OCC matrix to be generated by assigning a scrambling sequence vector pair with a high determine orthogonality, to a spreading sequence vector pair with a lower determined orthogonality (1506). For example, with reference to Tables 1 and 2, scrambling sequence vectors A1 and A2 may be assigned to spreading sequence vectors B1 and B3. In another aspect, where A1 is assigned to B1 and A2 is assigned to B2, A3 may be assigned to B3 and A4 may be assigned to B4.

Figure 16:
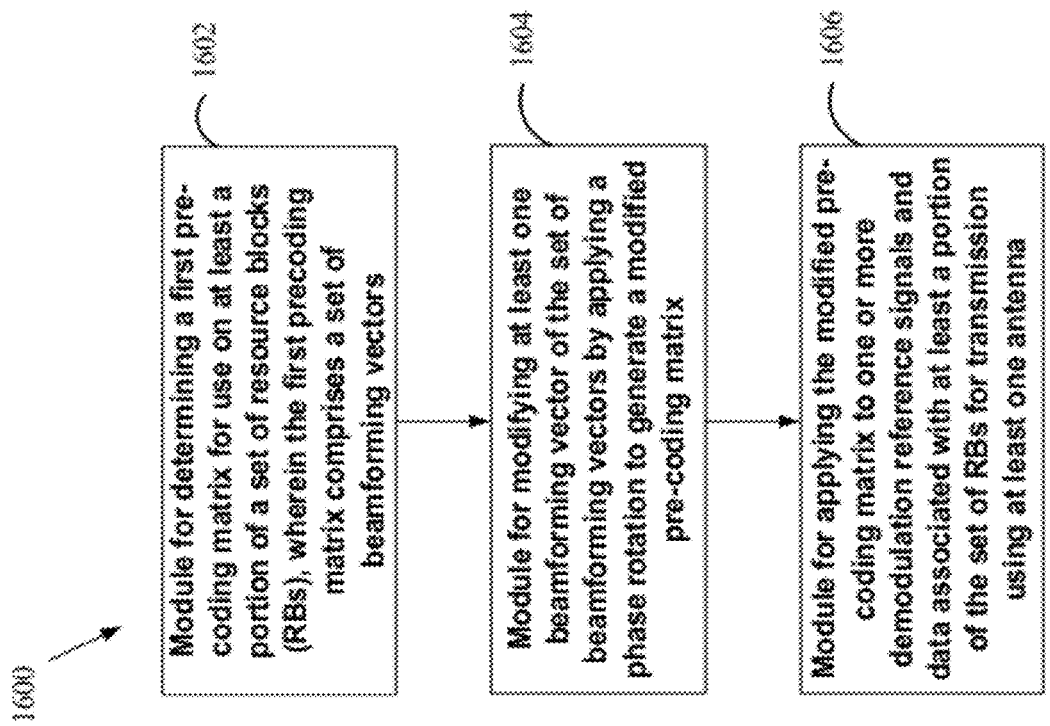
FIG. 16 is a conceptual block diagram illustrating the functionality of an example apparatus.

FIG. 16 is a conceptual block diagram 1400 illustrating the functionality of an example apparatus 100. The apparatus 100 includes a module 1602 that selects a first pre-coding matrix for use on at least a portion of a set of resource blocks (RBs), wherein the first pre-coding matrix comprises a set of beamforming vectors, a module 1604 that modifies at least one beamforming vector of the set of beamforming vectors by applying a phase rotation to generate a modified pre-coding matrix, and a module 1606 that applies the modified pre-coding matrix to one or more demodulation reference signals and data associated with at least a portion of the set of RBs for transmission using at least one antenna. The apparatus 100 may include additional modules that perform each of the steps in the aforementioned flow charts. As such, each step in the aforementioned flow charts may be performed by a module and the apparatus 100 may include one or more of those modules.

Figure 17:
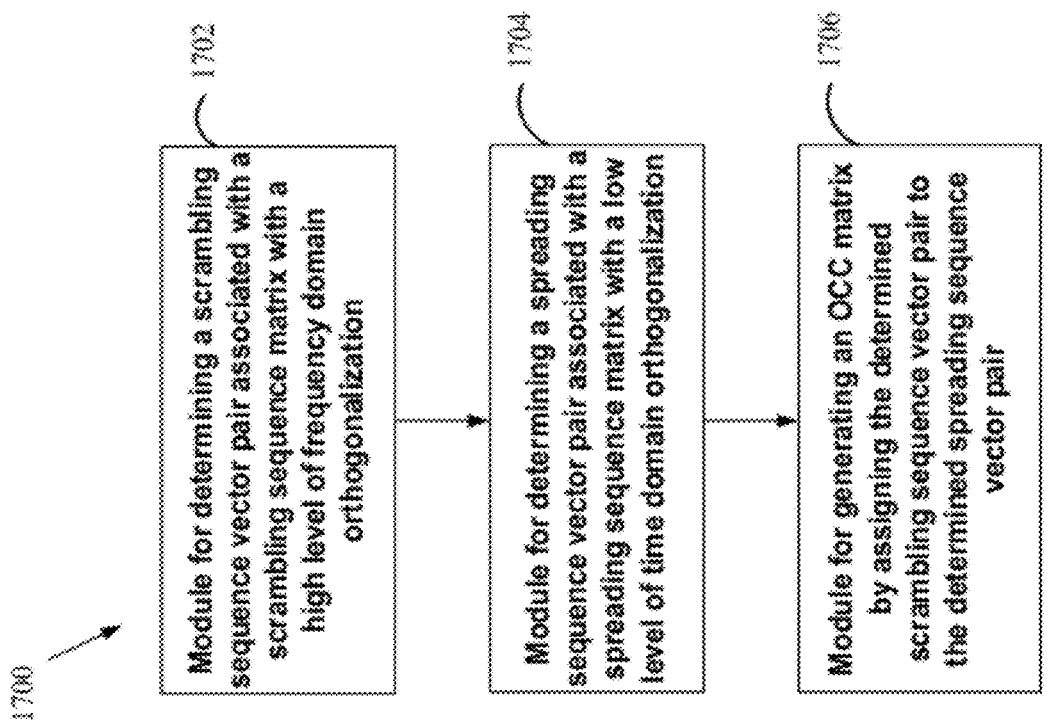
FIG. 17 is a conceptual block diagram illustrating the functionality of another example apparatus.

FIG. 17 is a conceptual block diagram 1500 illustrating the functionality of an example apparatus 100. The apparatus 100 includes a module 1702 that determines a scrambling sequence vector pair associated with a scrambling sequence matrix with a high level of frequency domain orthogonalization, a module 1704 that determines a spreading sequence vector pair associated with a spreading sequence matrix with a low level of time domain orthogonalization, and a module 1706 that generates an OCC matrix by assigning the determined scrambling sequence vector pair to the determined spreading sequence vector pair. The apparatus 100 may include additional modules that perform each of the steps in the aforementioned flow charts. As such, each step in the aforementioned flow charts may be performed by a module and the apparatus 100 may include one or more of those modules.

It is understood that the specific order or hierarchy of steps in the processes disclosed is an illustration of example approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims.

What is claimed is:

1. A method of wireless communication, comprising:
determining a first pre-coding matrix for use on a portion of a set of resource blocks (RBs), wherein the first pre-coding matrix includes a set of beamforming vectors;
modifying the first pre-coding matrix by applying a phase rotation to a first beamforming vector of the set of beamforming vectors of the first pre-coding matrix to generate a second beamforming vector of a modified pre-coding matrix, the applied phase rotation provides the second beamforming vector such that the second beamforming vector includes values that are same as values of the first beamforming vector and the values of the second beamforming vector are phase shifted with respect to the first beamforming vector so as to reduce transmission power variations across two or more orthogonal frequency domain modulation (OFDM) symbols corresponding to the set of RBs, wherein the modified pre-coding matrix has a same number of rows and a same number of columns as the first pre-coding matrix, wherein the second beamforming vector has a same direction as the first beamforming vector, wherein the phase rotation is applied to less than all of the beamforming vectors of the set; and
applying the modified pre-coding matrix to one or more demodulation reference signals and data associated with the portion of the set of RBs for transmission using at least one antenna.

2. The method of claim 1, further including transmitting the one or more demodulation reference signals and the data using the at least one antenna.

3. The method of claim 1, wherein the determining further comprises obtaining the first pre-coding matrix from a database associated with a base station.

4. The method of claim 1, further including:
obtaining information for at least one of channel quality indicator (CQI) feedback from one or more user equipments (UEs), pre-coding matrix index (PMI) feedback from one or more UEs, and channel measurements detected by a base station; and
determining the first pre-coding matrix based on the obtained information.

5. The method of claim 1, further comprising selecting the phase rotation, wherein each of the two or more OFDM symbols is used for communicating one of the one or more demodulation reference signals.

6. The method of claim 1, wherein the applying further comprises:
generating a first bundling group and a second bundling group, wherein the first and second bundling groups include different subsets of RBs of the set of RBs; and
applying the modified pre-coding matrix to the first bundling group and applying the first pre-coding matrix to the second bundling group.

7. The method of claim 6, further including transmitting the first bundling group and the second bundling group to a user equipment (UE), wherein the UE is enabled to perform joint channel estimation across each of the first bundling group and the second bundling group.

8. An apparatus for wireless communication, comprising:
means for determining a first pre-coding matrix for use on a portion of a set of resource blocks (RBs), wherein the first pre-coding matrix includes a set of beamforming vectors;
mean for modifying the first pre-coding matrix by applying a phase rotation to a first beamforming vector of the first set of beamforming vectors of the first pre-coding matrix to generate a second beamforming vector of a modified pre-coding matrix, the applied phase rotation provides the second beamforming vector such that the second beamforming vector includes values that are same as values of the first beamforming vector and the values of the second beamforming vector are phase shifted with respect to the first beamforming vector so as to reduce transmission power variations across two or more orthogonal frequency domain modulation (OFDM) symbols corresponding to the set of RBs, wherein the modified pre-coding matrix has a same number of rows and a same number of columns as the first pre-coding matrix, wherein the second beamforming vector has a same direction as the first beamforming vector, wherein the phase rotation is applied to less than all of the beamforming vectors of the set; and means for applying the modified pre-coding matrix to one or more demodulation reference signals and data associated with the portion of the set of RBs for transmission using at least one antenna.

9. The apparatus of claim 8, further including means for transmitting the one or more demodulation reference signals and the data using the at least one antenna.

10. The apparatus of claim 8, wherein the means for determining further comprises means for obtaining the first pre-coding matrix from a database associated with a base station.

11. The apparatus of claim 8, further including:
means for obtaining information for at least one of CQI feedback from one or more user equipments (UEs), PMI feedback from one or more UEs, and channel measurements detected by a base station; and
means for determining the first pre-coding matrix based on the obtained information.

12. The apparatus of claim 8, further comprising means for selecting the phase rotation, wherein each of the two or more OFDM symbols is used for communicating one of the one or more demodulation reference signals.

13. The apparatus of claim 8, wherein the means for applying further comprises:
means for generating a first bundling group and a second bundling group, wherein the first and second bundling groups include different subsets of RBs of the set of RBs; and
means for applying the modified pre-coding matrix to the first bundling group and applying the first pre-coding matrix to the second bundling group.

14. The apparatus of claim 13, further including means for transmitting the first bundling group and the second bundling group to a user equipment (UE), wherein the UE is enabled to perform joint channel estimation across each of the first bundling group and the second bundling group.

15. A non-transitory computer-readable medium storing computer executable code for wireless communication, the computer executable code comprising:
instructions for causing a computer to determine a first pre-coding matrix for use on a portion of a set of resource blocks (RBs), wherein the first pre-coding matrix includes a set of beamforming vectors;
instructions for causing the computer to modify the first pre-coding matrix by applying a phase rotation to a first beamforming vector of the set of beamforming vectors of the first precoding matrix to generate a second beamforming vector of a modified pre-coding matrix, the applied phase rotation provides the second beamforming vector such that the second beamforming vector includes values that are same as values of the first beamforming vector and the values of the second beamforming vector are phase shifted with respect to the first beamforming vector so as to reduce transmission power variations across two or more orthogonal frequency domain modulation (OFDM) symbols corresponding to the set of RBs, wherein the modified pre-coding matrix has a same number of rows and a same number of columns as the first pre-coding matrix, wherein the second beamforming vector has a same direction as the first beamforming vector, wherein the phase rotation is applied to less than all of the beamforming vectors of the set; and instructions for causing the computer to apply the modified pre-coding matrix to one or more demodulation reference signals and data associated with the portion of the set of RBs for transmission using at least one antenna.

16. The non-transitory computer-readable medium of claim 15, wherein the computer executable code further comprises instructions for causing the computer to transmit the one or more demodulation reference signals and the data using the at least one antenna.

17. The non-transitory computer-readable medium of claim 15, wherein the computer executable code further comprises instructions for causing the computer to obtain the first pre-coding matrix from a database associated with a base station.

18. The non-transitory computer-readable medium of claim 15, wherein the computer executable code further comprises:
instructions for causing the computer to obtain information for at least one of: CQI feedback from one or more user equipments (UEs), PMI feedback from one or more UEs, and channel measurements detected by a base station; and
instructions for causing the computer to determine the first pre-coding matrix based on the obtained information.

19. The non-transitory computer-readable medium of claim 15, the computer executable code further comprising instructions for causing the computer to select the phase rotation, wherein each of the two or more OFDM symbols is used for communicating one of the one or more demodulation reference signals.

20. The non-transitory computer-readable medium of claim 15, wherein the computer executable code further comprises:
instructions for causing the computer to generate a first bundling group and a second bundling group, wherein the first and second bundling groups include different subsets of RBs of the set of RBs; and
instructions for causing the computer to apply the modified pre-coding matrix to the first bundling group and applying the first pre-coding matrix to the second bundling group.

21. The non-transitory computer-readable medium of claim 20, wherein the computer executable code further comprises instructions for causing the computer to transmit the first bundling group and the second bundling group to a user equipment (UE), wherein the UE is enabled to perform joint channel estimation across each of the first bundling group and the second bundling group.

22. An apparatus for wireless communication, comprising:
at least one processor configured to:
determine a first pre-coding matrix for use on a portion of a set of resource blocks (RBs), wherein the first pre-coding matrix includes a set of beamforming vectors;
modify the first pre-coding matrix by applying a phase rotation to a first beamforming vector of the set of beamforming vectors of the first pre-coding matrix to generate a second beamforming vector of a modified pre-coding matrix, the applied phase rotation provides the second beamforming vector such that the second beamforming vector includes values that are same as values of the first beamforming vector and the values of the second beamforming vector are phase shifted with respect to the first beamforming vector so as to reduce transmission power variations across two or more orthogonal frequency domain modulation (OFDM) symbols corresponding to the set of RBs, wherein the modified pre-coding matrix has a same number of rows and a same number of columns as the first pre-coding matrix, wherein the second beamforming vector has a same direction as the first beamforming vector, wherein the phase rotation is applied to less than all of the beamforming vectors of the set; and
apply the modified pre-coding matrix to one or more demodulation reference signals and data associated with the portion of the set of RBs for transmission using at least one antenna; and
memory coupled to the at least one processor.

23. The apparatus of claim 22, wherein the at least one processor is further configured to transmit the one or more demodulation reference signals and the data using the at least one antenna.

24. The apparatus of claim 22, wherein the at least one processor is further configured to obtain the first pre-coding matrix from a database associated with a base station.

25. The apparatus of claim 22, wherein the at least one processor is further configured to:
obtain information for at least one of: CQI feedback from one or more user equipments (UEs), PMI feedback from one or more UEs, and channel measurements detected by a base station; and
determine the first pre-coding matrix based on the obtained information.

26. The apparatus of claim 22, wherein the at least one processor is further configured to select the phase rotation, wherein each of the two or more OFDM symbols is used for communicating one of the one or more demodulation reference signals.

27. The apparatus of claim 22, wherein the at least one processor is further configured to:
generate a first bundling group and a second bundling group, wherein the first and second bundling groups include different subsets of RBs of the set of RBs; and
apply the modified pre-coding matrix to the first bundling group and applying the first pre-coding matrix to the second bundling group.

28. The apparatus of claim 27, wherein the at least one processor is further configured to transmit the first bundling group and the second bundling group to a user equipment (UE), wherein the UE is enabled to perform joint channel estimation across each of the first bundling group and the second bundling group.

29. The method of claim 1, wherein and the modified pre-coding matrix is generated by multiplying a subset of the beamforming vectors of the first pre-coding matrix by −1, the subset of the beamforming vectors including the first beamforming vector.

* * * * *